US010027765B2

(12) United States Patent
Brewer (10) Patent No.: US 10,027,765 B2
(45) Date of Patent: Jul. 17, 2018

(54) RECOMMENDING OBJECTS TO A SOCIAL NETWORKING SYSTEM USER BASED IN PART ON TOPICS ASSOCIATED WITH THE OBJECTS

(71) Applicant: Facebook, Inc., Menlo Park, CA (US)

(72) Inventor: Jason Eric Brewer, Kirkland, WA (US)

(73) Assignee: Facebook, Inc., Menlo Park, CA (US)

( * ) Notice: Subject to any disclaimer, the term of this patent is extended or adjusted under 35 U.S.C. 154(b) by 629 days.

(21) Appl. No.: 14/589,835

(22) Filed: Jan. 5, 2015

(65) Prior Publication Data

US 2016/0198005 A1 Jul. 7, 2016

(51) Int. Cl.
 *G06F 15/16* (2006.01)
 *H04L 29/08* (2006.01)

(52) U.S. Cl.
 CPC .............. *H04L 67/16* (2013.01); *H04L 67/20* (2013.01); *H04L 67/22* (2013.01); *H04L 67/26* (2013.01); *H04L 67/306* (2013.01)

(58) Field of Classification Search
 CPC ......... H04L 67/16; H04L 67/20; H04L 67/22; H04L 67/26; H04L 67/306
 USPC ................................. 709/202–205, 227–229
 See application file for complete search history.

(56) References Cited

U.S. PATENT DOCUMENTS

| | | | | |
|---|---|---|---|---|
| 8,694,656 B2* | 4/2014 | Douillet | ............... | H04L 67/306 709/205 |
| 9,373,878 B2* | 6/2016 | Schuppener | ......... | G02B 6/4416 |
| 9,465,848 B2* | 10/2016 | Lee | .................... | G06F 17/30979 |
| 2012/0324004 A1* | 12/2012 | Le | .......................... | G06Q 10/00 709/204 |
| 2014/0040370 A1* | 2/2014 | Buhr | ..................... | H04L 67/306 709/204 |
| 2014/0143325 A1* | 5/2014 | Lessin | ................... | H04L 67/306 709/204 |
| 2015/0271222 A1* | 9/2015 | Rao | ......................... | H04L 67/16 709/204 |
| 2015/0370798 A1* | 12/2015 | Ju | ..................... | G06F 17/30867 707/748 |
| 2017/0103343 A1* | 4/2017 | Yee | ...................... | G06N 99/005 |
| 2017/0134897 A1* | 5/2017 | Sayed | .................... | H04L 67/26 |

\* cited by examiner

Primary Examiner — Bharat N Barot
(74) Attorney, Agent, or Firm — Fenwick & West LLP (57) ABSTRACT

A social networking system recommends pages or other objects to a user with which the user may establish a connection to receive content associated with an object. Candidate objects may be identified by the social networking system as objects connected to additional users who are connected to an object connected to the user. To recommend objects with which the user is likely to have an interest, the social networking system extracts one or more topics from the object connected to the user and from various candidate objects. Based on a topic graph, the social networking system determines measures of relatedness between topics extracted from various candidate objects and an object connected to the user. The measures of relatedness are then used to select one or more of the candidate objects to identify to the user.

18 Claims, 3 Drawing Sheets

RECOMMENDING OBJECTS TO A SOCIAL NETWORKING SYSTEM USER BASED IN PART ON TOPICS ASSOCIATED WITH THE OBJECTS

BACKGROUND

This disclosure relates generally to recommending objects to a social networking system user, and more specifically to using topics associated with objects to recommend objects to a social networking system user.

Social networking systems allow their users to easily connect to and communicate with other users. A social networking system may maintain objects that correspond to content associated with different types of content. For example, an object identifies content associated with a page for an entity, content associated with a group of users, or content associated with an event. Information associated with an object may be presented to users of the social networking system to provide information to the users.

Users of the social networking system may establish connections with various objects to receive content associated with the objects or to indicate preferences for various objects. However, as a social networking system maintains an increasing number of objects, a user may have difficulty to identify objects likely to be of interest to the user. The social networking system may recommend objects to a user to allow a user to more easily establish connections to the recommended objects. Conventional social networking systems identify to a user objects connected to users who are also connected to an object connected to the user. While this identifies objects to the user, the identified objects may be unrelated to objects that are connected to the user. This decreases the likelihood of the user interacting with the identified objects.

SUMMARY

A social networking system maintains various objects, each associated with content. Users of the social networking system may establish connections to various objects to subsequently receive content associated with the various objects. Additionally, when a user establishes a connection to an object, the social networking system obtains additional information about the user (e.g., interests of the user), which allows the social networking system to subsequently provide more relevant content to the user. To increase user interaction with objects, the social networking system may identify one or more objects to a user to increase the likelihood of the user establishing a connection with the object. When identifying one or more objects for presentation to a user, the social networking system accounts for one or more topics extracted from objects to which the user is connected as well as one or more topics extracted from additional objects. This increases the likelihood of an object identified by the social networking system being related to an object to which the user is connected.

To select one or more objects for presentation to a user, the social networking system selects a seed object that is connected to the user and identifies one or more topics extracted from the seed object. For example, one or more topics are extracted from the seed object by the social networking system. A topic identifies a subject associated with the seed object. Additionally, the social networking system accesses a topic graph that describes relationships between various topics (e.g., subjects) from a third party system or determines a topic graph based on information accessed from the third party system. In the topic graph, a topic is connected to an additional topic if information associated with the topic by the third party system identifies the additional topic or if information associated with the additional topic identifies the topic. The social networking system may determine the topic graph based on information accessed from a third party system that maintains multiple pages (or other information) associated with various topics and identifies additional topics identified by a page associated with a topic. In some embodiments, information associated with a topic by the third party system includes various sections, and the social networking system identifies additional topics connected to the topic based on one or more rules identifying sections of the information associated with the topic. For example, additional topics identified in an introduction section, in an informational section, and in a category section of information associated with a topic are identified by the social networking system as connected to the topic. However, in other embodiments, rules maintained by the social networking system specify any suitable criteria for identifying additional topics connected to a topic based on information associated with the topic by the third party system. Alternatively, the social networking system accesses a topic graph generated and maintained by the third party system.

From the topic graph, the social networking system identifies additional topics that are related to one or more topics extracted from the seed object. In one embodiment, one or more topics directly connected to the object extracted from the seed object via the topic graph are identified as additional topics. For example, the topic graph includes various nodes corresponding to topics that include hierarchies of topics; in this example, the social networking system identifies additional topics corresponding to nodes having a lower position in a hierarchy including a node corresponding to the topic extracted from the seed object (i.e., additional topics that are children of the topic extracted from the seed object) or identifies additional topics corresponding to nodes having a higher position in the hierarchy including the node corresponding to the topic extracted from the seed object (i.e., additional topics that are parents of the topic extracted from the seed object). Additionally, topics having certain types of indirect connections to the topic extracted from the seed object through the topic graph may be identified as additional topics. For example, topics having no more than a specified number of intervening topics between the topic extracted from the seed object and the topic are identified as additional topics (i.e., additional topics are identified based on a degree of separation between the topic and the topic extracted from the seed object). In some embodiments, certain topics may be combined with other additional topics by the social networking system. For example, an intervening topic between the topic extracted from the seed object and additional topic is combined with the additional topic if the intervening topic is associated with less than a threshold amount of information or is associated with less than a threshold number of objects.

The social networking system also identifies additional users of the social networking system who are connected to the seed object. Based on the additional users or the additional topics, the social networking system identifies candidate objects and selects one or more of the candidate objects. In some embodiments, the social networking system identifies candidate objects as objects connected to at least a threshold number of additional users who are also connected to the seed object. Alternatively, the social networking system identifies candidate objects as objects associated with one or more topics (or at least a threshold number of topics) that are related to a topic extracted from the seed object via the topic graph (i.e., objects associated with one or more of the additional topics).

A score is generated for each candidate object, with a score for a candidate object based on a number of additional users connected to the candidate object and connected to the seed object as well as measures of relatedness between topics extracted from the candidate object and topics extracted from the seed object. The measure of relatedness between a topic extracted from the candidate object and a topic extracted from the seed object may be inversely proportional to a degree of separation between the topic extracted from the candidate object and the topic extracted from the seed object in the topic graph. A machine learned model may be applied to the topics extracted from the candidate object and the number of additional users connected to the candidate object and connected to the seed object to generate the score for the candidate object. Based on the scores, the social networking system selects one or more candidate objects and communicates information describing the selected candidate objects to a client device for presentation to the user. For example, the social networking system ranks candidate objects based on their scores and selects candidate objects having at least a threshold position in the ranking. Information describing the selected candidate objects may be presented to the user in any suitable format (e.g., as a content item included in a feed of content items to the user, as a recommendation presented along with a feed of content items, as a text message, etc.).

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
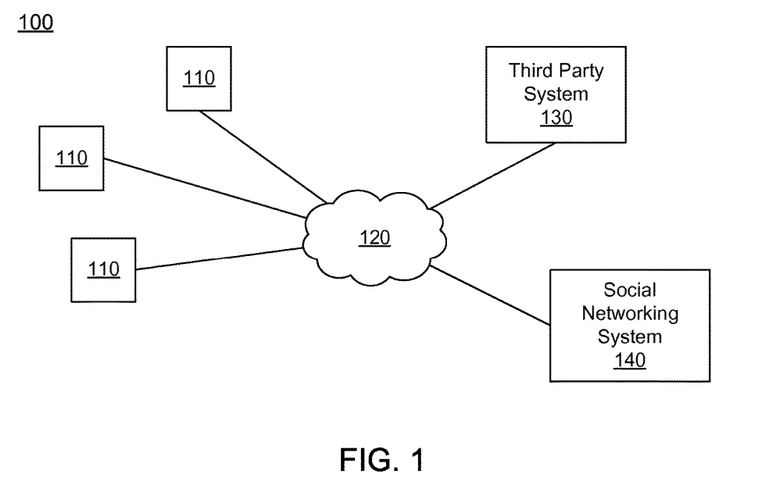
FIG. 1 is a block diagram of a system environment in which a social networking system operates, in accordance with an embodiment.

FIG. 1 is a block diagram of a system environment 100 for a social networking system 140. The system environment 100 shown by FIG. 1 comprises one or more client devices 110, a network 120, one or more third-party systems 130, and the social networking system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the social networking system 140, such as advertisements, content, information describing a group of users of the social networking system 140, or information about an application provided by the third party system 130. In some embodiments, a third party system 130 may communicate information directly to the social networking system 140.

A third party system 130 may maintain information associated with multiple topics. For example, the third party system 130 maintains multiple pages that each include content associated with one or more topics. Additionally, the third party system 130 also maintains information describing connections between topics or information identifying topics related to each other. For example, the third party system maintains a topic graph that includes connections between topics that are related to each other. Topics may be related to each other because they address similar subject matter, because they are associated with similar subject matter, because they provide additional information about each other, or because of any other suitable condition. A page associated with a topic may include information identifying one or more additional topics that are related to the topic, allowing a user accessing the third party system 130 to easily navigate between pages associated with related topics.

Figure 2:
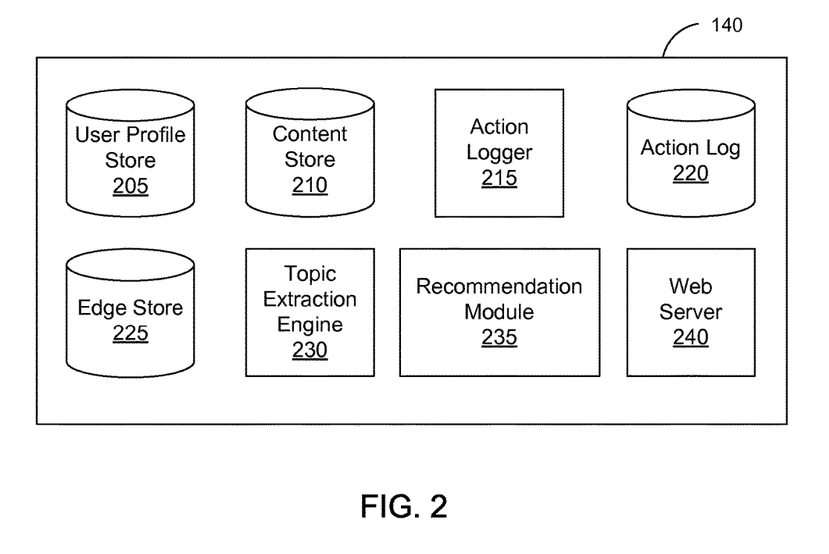
FIG. 2 is a block diagram of a social networking system, in accordance with an embodiment.

FIG. 2 is a block diagram of an architecture of the social networking system 140. The social networking system 140 shown in FIG. 2 includes a user profile store 205, a content store 210, an action logger 215, an action log 220, an edge store 225, a topic extraction engine 230, a recommendation module 235, and a web server 240. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture. In other embodiments, the functionality described herein may be adapted for use by online systems other than social networking systems 140.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image. A user profile in the user profile store 205 may also maintain references to actions by the corresponding user performed on content items in the content store 210 and stored in the action log 220. In some embodiments, a third party system 130 may indirectly retrieve information from the user profile store 205, subject to one or more privacy settings associated with a user profile by a user, to identify a user profile in the user profile store 205 associated with a user of the third party system 130.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system 140, events, groups or applications. In some embodiments, objects are received from third-party applications or third-party applications separate from the social networking system 140. In one embodiment, objects in the content store 210 represent single pieces of content, or content "items." Hence, social networking system users are encouraged to communicate with each other by posting text and content items of various types of media to the social networking system 140 through various communication channels. This increases the amount of interaction of users with each other and increases the frequency with which users interact within the social networking system 140.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the social networking system 140 that are included in the action log 220 include: commenting on a photo album, commenting on a content item, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website may recognize a user of an social networking system 140 through a social plug-in enabling the e-commerce website to identify the user of the social networking system 140. Because users of the social networking system 140 are uniquely identifiable, e-commerce websites, such as in the preceding example, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system 140, sharing a link with other users of the social networking system 140, and commenting on posts made by other users of the social networking system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's interest in an object or another user in the social networking system 140 based on the actions performed by the user. A user's affinity may be computed by the social networking system 140 over time to approximate a user's interest in an object, a topic, or another user in the social networking system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The social networking system 140 also includes a topic extraction engine 230, which identifies one or more topics associated with objects in the content store 210. A topic associated with an object identifies a subject associated with an object. To identify topics associated with content items, the topic extraction engine 230 identifies anchor terms included in a content item and determines a meaning of the anchor terms as further described in U.S. application Ser. No. 13/167,701, filed Jun. 24, 2011, which is hereby incorporated by reference in its entirety. For example, the topic extraction engine 230 determines one or more topics associated with a content item maintained in the content store 210. The one or more topics associated with a content item are stored and associated with an object identifier corresponding to the content item. In various embodiments, associations between object identifiers and topics are stored in the topic extraction engine 230 or in the content store 210 to simplify retrieval of one or more topics associated with an object identifier or retrieval of object identifiers associated with a specified topic. Structured information associated with a content item may also be used to extract a topic associated with the content item.

In some embodiments, the social networking system 140 includes a recommendation module 235 that identifies objects to a user with which the user may establish a connection. As the user establishes connections to objects maintained by the social networking system 140, additional information about the user is obtained by the social networking system 140. This allows the social networking system 140 to more accurately identify content for presentation that is likely to be of interest to the user. To increase the likelihood of the user interacting with objects identified to the user, the recommendation module 235 selects objects for presentation to the user based at least in part on one or more topics extracted from objects and users connected to objects who are also connected to an object that is connected to the user.

To select one or more objects for presentation to a user, the recommendation module 235 selects a seed object that is connected to the user and identifies one or more topics extracted from the seed object. For example, one or more topics extracted from the seed object by the topic extraction engine 230 are identified. The recommendation module 235 also accesses a topic graph that describes relationships between various topics from a third party system 130 or determines a topic graph based on information retrieved from the third party system 130. A topic is connected to an additional topic in the topic graph if information associated with the topic identifies the additional topic or if information associated with the additional topic identifies the topic. To determine the topic graph, the recommendation module 235 accesses information from a third party system 130 that maintains multiple pages (or other information) associated with various topics and identifies additional topics identified by a page associated with a topic. In some embodiments, the information associated with a topic by the third party system 130 includes various sections, and the recommendation module 235 identifies additional topics connected to the topic based on one or more rules identifying sections of the information associated with the topic. For example, additional topics identified in an introduction section, in an informational section, and in a categories section of information associated with a topic are identified as connected to the topic. However, in other embodiments, rules maintained by the recommendation module 235 specify any suitable criteria for identifying additional topics connected to a topic based on information associated with the topic by the third party system 130. Alternatively, the recommendation module 235 accesses a topic graph, or a portion of a topic graph, generated and maintained by the third party system 130.

From the topic graph, the recommendation module 235 identifies additional topics that are related to one or more topics extracted from the seed object. In one embodiment, one or more topics directly connected to the object extracted from the seed object via the topic graph are identified as additional topics. For example, additional topics are topics identified by the topic graph as child topics of the topic extracted from the seed object by a hierarchy in the topic graph or as parent topics of the topic extracted from the seed object by a hierarchy in the topic graph. Additionally, topics having certain types of indirect connections to the topic extracted from the seed object through the topic graph may be identified as additional topics. For example, topics having no more than a specified number of intervening topics between the topic extracted from the seed object and the topic are identified as additional topics (i.e., additional topics are identified based on a degree of separation between the topic and the topic extracted from the seed object). In some embodiments, certain topics may be combined with other additional topics by the social networking system. For example, an intervening topic between the topic extracted from the seed object and additional topic is combined with the additional topic if the intervening topic is associated with less than a threshold amount of information or is associated with less than a threshold number of objects.

Additionally, the recommendation module 235 identifies additional users of the social networking system who are connected to the seed object. Based on the additional users or the additional topics, the recommendation module identifies candidate objects and selects one or more of the candidate objects. In some embodiments, the recommendation module 235 identifies candidate objects as objects connected to at least a threshold number of additional users who are also connected to the seed object. Alternatively, the recommendation module 235 identifies candidate objects as objects associated with one or more topics (or at least a threshold number of topics) that are related to a topic extracted from the seed object via the topic graph (i.e., objects associated with one or more of the additional topics). A score is generated for each candidate object, with a score for a candidate object based on a number of additional users connected to the candidate object and connected to the seed object as well as measures of relatedness between topics extracted from the candidate object and topics extracted from the seed object. The measure of relatedness between a topic extracted from the candidate object and a topic extracted from the seed object may be inversely proportional to a degree of separation between the topic extracted from the candidate object and the topic extracted from the seed object in the topic graph. Based on the scores, the recommendation module 235 selects one or more candidate objects and communicates information describing the selected candidate objects to a client device 110 for presentation to the user. Selection of candidate objects is further described below in conjunction with FIG. 3.

The web server 240 links the social networking system 140 via the network 120 to the one or more client devices 110, as well as to the one or more third party systems 130. In some embodiments, the web server 240 links the social networking system 140 directly ton one or more third party systems 130. The web server 240 serves web pages, as well as other content, such as JAVA®, FLASH®, XML and so forth. The web server 240 may receive and route messages between the social networking system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, WEBOS® or BlackberryOS.

Determining Objects for Recommendation to a Social Networking System User

Figure 3:
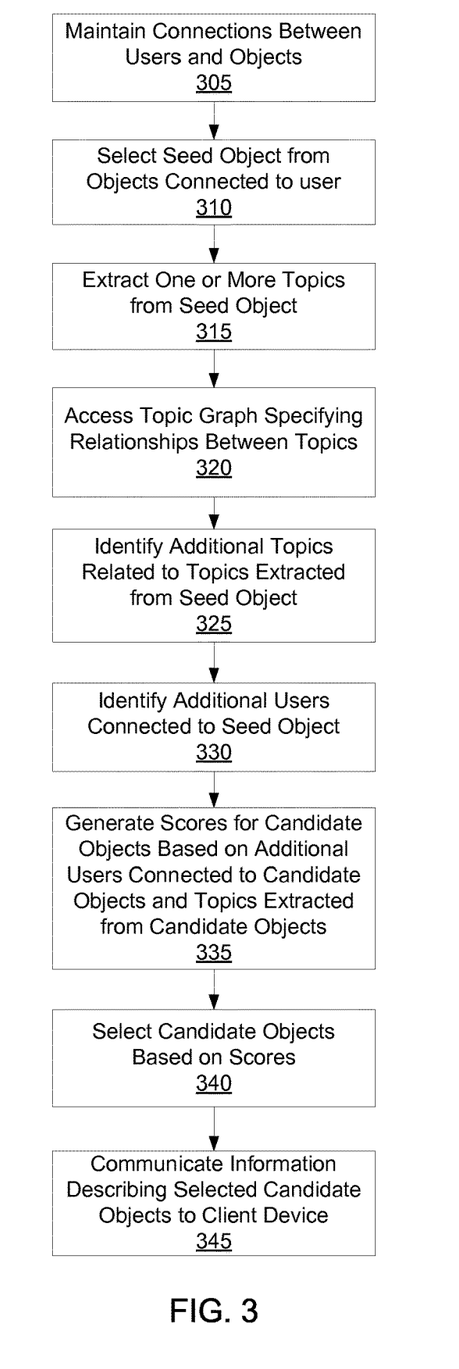
FIG. 3 is a flowchart of a method for determining objects for recommendation to a user of a social networking system based at least in part on topics associated with the objects, in accordance with an embodiment.

FIG. 3 is a flow chart of a method for determining objects for recommendation to a user of a social networking system 140 based at least in part on topics associated with the objects. In other embodiments, the method may include different and/or additional steps than those described in conjunction with FIG. 3. Additionally, in some embodiments, the method may perform the steps described in conjunction with FIG. 3 in different orders.

The social networking system 140 maintains various objects. Each object corresponds to content maintained by the social networking system 140, as further described above in conjunction with FIG. 2. For example, an object is a page maintained by the social networking system 140, a content item maintained by the social networking system 140, or any other suitable information maintained by the social networking system 140. As a user interacts with the social networking system 140, the user establishes connections with various objects. For example, the user indicates a preference for a page, which establishes a connection between the user and the page; based on the connection, the user subsequently receives content associated with the page. The social networking system 140 maintains 305 the connections between the user and the objects.

To increase interaction between the user and the social networking system 140, the social networking system 140 may recommend objects to the user. If the user interacts with the recommended objects, the social networking system 140 obtains additional information about the user, allowing the social networking system 140 to provide content to a user with which the user is more likely to interact. The social networking system 140 may base recommendation of content to the user on objects that are connected to the user.

The social networking system 140 selects 310 a seed object from the one or more objects connected to the user and extracts 315 one or more topics from the seed object. The seed object may be an object with which the user has a maximum affinity, an object with which the user most recently interacted, an object with which the user established a connection during a specified time interval, an object associated with an additional user having a type of connection to the user, or may be an object satisfying any other suitable criteria. Extraction of topics from an object is further described above in conjunction with FIG. 2. Topics extracted from the seed object may be stored in association with the seed object by the social networking system 140. In some embodiments, a set of topics extracted from the seed object is stored in association with the seed object by the social networking system 140. Alternatively, each topic extracted from the seed object is stored in association with the seed object by the social networking system 140.

Additionally, the social networking system 140 accesses 320 a topic graph that specifies relationships between various topics. The topic graph includes multiple topics and connections between topics that are related to each other. A topic is connected to an additional topic if information associated with the topic identifies the additional topic or if information associated with the additional topic identifies the topic. In some embodiments, the social networking system 140 determines the topic graph based on information associated with various topics by a third party system 130 and accessed 320 by the social networking system 140. For example, a third party system 130 maintains multiple pages (or other information) associated with various topics, and the social networking system 140 identifies additional topics identified by a page associated with a topic. In some embodiments, the information associated with a topic by the third party system 130 includes various sections, and the social networking system 140 identifies additional topics connected to the topic based on one or more rules identifying sections of the information associated with the topic. For example, additional topics identified in an introduction section, in an informational section, and in a categories section of information associated with a topic are identified as connected to the topic. However, in other embodiments, rules maintained by the online system 140 may specify any suitable criteria for identifying additional topics connected to a topic based on information associated with the topic by the third party system 130. Alternatively, the online system 140 may access 320 a topic graph, or a portion of a topic graph, generated and maintained by the third party system 130.

Based on the topic graph, the social networking system 140 identifies 325 one or more additional topics related to one or more topics extracted from the seed object. Types of connections between an object extracted from the seed object and other objects in the topic graph are used to identify 325 additional topics related to the topic extracted from the seed object. In one embodiment, one or more topics directly connected to the object extracted from the seed object are identified 325 as additional topics. Additionally, topics having certain types of indirect connections to the topic extracted from the seed object through the topic graph may be identified 325 as additional topics. For example, topics having no more than a specified number of intervening topics between the topic extracted from the seed object and the topic are identified 325 as additional topics (i.e., based on a degree of separation between the topic and the topic extracted from the seed object). As a specific example, topics connected via the topic graph to a single intervening topic that is connected to a topic extracted from the seed object are identified 325 as additional topics (i.e., topics with one degree of separation from the topic extracted from the seed object), while a topic connected to a series of intervening users between the topic and the topic extracted from the seed object (i.e., a topic with two or more degrees of separation from the topic extracted from the seed object) are not identified 325 as additional topics.

Additionally, the social networking system 140 identifies 330 one or more additional users of the social networking system connected to the seed object. The social networking system 140 may identify 330 additional users connected to the seed object and having one or more specified characteristics (e.g., users associated with a specified location, users having a specified type of connection with the user, users having a specified type of connection to the seed object) or may identify 330 any user connected to the seed object. Based on the identified additional topics or the additional identified users, the social networking system 140 selects one or more candidate objects and generates 335 scores for each candidate object based on a measure of relatedness between one or more topics extracted from the candidate object and one or more topics extracted from the seed object and/or a number of additional users connected to the candidate object and also connected to the seed object.

In one embodiment, the social networking system 140 selects candidate objects associated with at least one of the additional topics, so each candidate object is associated with a topic identified as related to a topic extracted from the seed object. For each candidate object, the social networking system 140 generates 335 a score for a candidate object based at least in part on a number of additional users connected to the candidate object and connected to the seed object. In one embodiment, the score is the number of additional users connected to the candidate object and also connected to the seed object. Alternatively, the social networking system 140 selects candidate objects connected to at least a threshold number of additional users who are also connected to the seed object. For each candidate object, the social networking system 140 generates 335 a score based at least in part on a measure of relatedness between one or more topics extracted from the candidate object and one or more topics extracted from the seed object. In some embodiments, the measure of relatedness is based on a degree of separation between topics extracted from the candidate object and topics extracted from the seed object; for example, values are determined for each topic extracted from the candidate object and combined to generate 335 the score associated with the candidate object. A value determined for a topic extracted from the candidate object may be inversely proportional to a degree of separation between the topic and a topic extracted from the seed object, so topics extracted from the candidate object that are connected to a greater number of intervening topics before a connection to the topic extracted from the seed object have lower scores.

Alternatively, the social networking system 335 selects candidate objects satisfying any suitable criteria and generates 335 scores for each candidate object based on a number of additional users connected to the candidate objects and also connected to the seed object as well as measures of relatedness between one or more topics extracted from candidate objects and one or more topics extracted from the seed object. In one embodiment, the social networking system 140 applies a machine learned model to a candidate object that generates 335 a score based on a number of additional users connected to the candidate object who are also connected to the seed object and measures of relatedness between topics extracted from the candidate object and topics extracted from the seed object. As described above, a measure of relatedness between a topic extracted from the candidate object and a topic extracted from the seed object may be based on a degree of separation between the topic extracted from the seed object and the topic extracted from the candidate object. Topics extracted from the candidate object having a lower degree of separation from a topic extracted from the seed object have higher values in various embodiments. Additionally, a value used to generate 335 the score for a candidate object may be proportional to a number of additional users connected to the candidate object who are also connected to the candidate object, so the value is larger when a larger number of additional users connected to the candidate object are also connected to the candidate object.

Based on the scores for the candidate objects, the social networking system 140 selects 340 one or more of the candidate objects. In one embodiment, the social networking system 140 ranks the candidate objects based on their scores and selects 340 candidate objects having at least a threshold position in the ranking. Alternatively, the social networking system 140 selects 340 candidate objects having at least a threshold score.

Information describing the selected candidate objects is communicated 345 from the social networking system 140 communicating information identifying the selected one or more candidate pages to a client device for presentation to the user. For example, the social networking system 140 communicates 345 a content item identifying a selected candidate content item and including a recommendation to establish a connection to the selected candidate content item to a client device 110 associated with the user. The content item is presented in a feed of content items presented to the user by the client device 110. Alternatively, the social networking system 140 generates a recommendation to establish a connection to a selected candidate object that includes an identifier or a description of the selected candidate object and an instruction that, when executed, establishes a connection between the user and the selected candidate object. The recommendation may be presented in addition to a feed of content items (e.g., presented in a location of a display proximate to the feed of content items) or may be presented through a specific interface. However, the information identifying the selected one or more selected candidate content items may be communicated 345 to the client device 110 using any suitable communication channel (e.g., push notification message, text message, e-mail, etc.).

Figure 4:
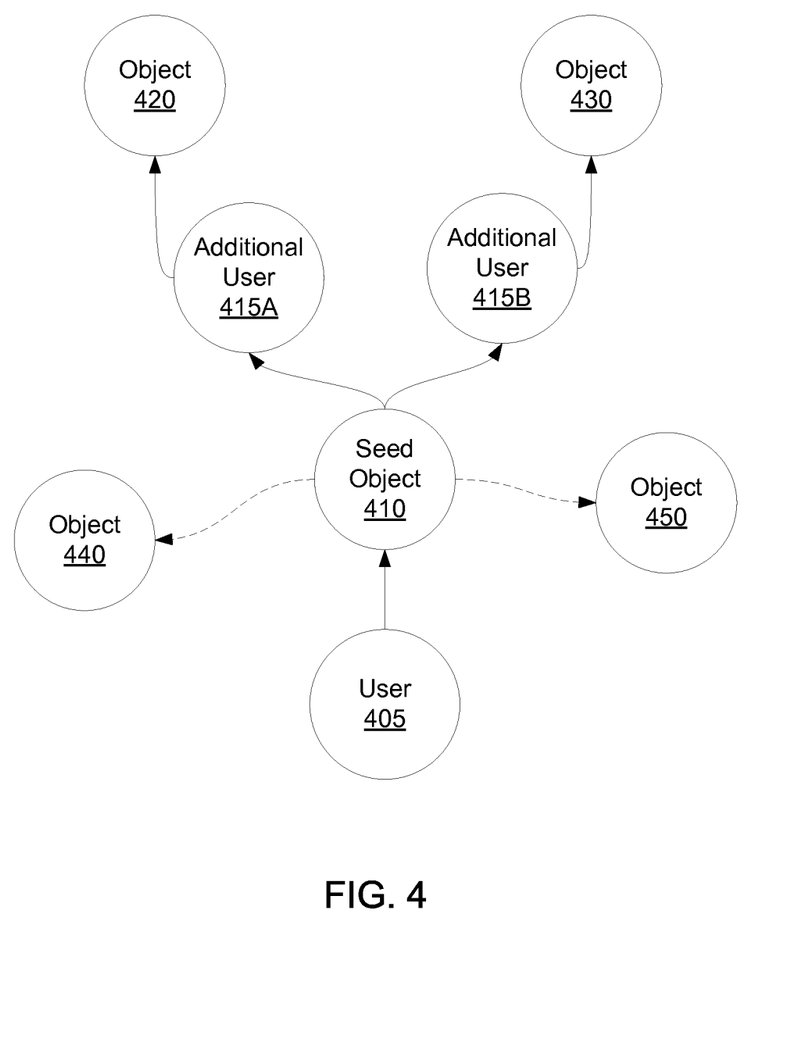
FIG. 4 is a conceptual diagram illustrating selection of candidate objects from which an object is identified for presentation to a user, in accordance with an embodiment.

FIG. 4 is a conceptual diagram illustrating selection of candidate objects from which an object is identified for presentation to a user. In the example of FIG. 4, a user 405 is connected to a seed object 410. Additional users 415A, 415B are also connected to the seed object 410. One or more topics are also associated with the seed object 410, and may be extracted from the seed object 410 as described above in conjunction with FIG. 2. The social networking system 140 identifies object 420, which is connected to additional user 415A, and object 430, which is connected to additional user 415B. Object 420 and object 430 may be identified as candidate objects because they are connected to users (users 415A, 415) who are also connected to the seed object 410. Additionally, based on the topics extracted from the seed object 410, the social networking system 140 may identify object 440 and object 450 as candidate objects because object 440 and object 450 are each associated with an additional topic that has at least a threshold measure of relatedness to a topic associated with the seed object based on a topic graph. For example, object 440 is associated with a topic that is directly connected to a topic associated with the seed object 410 via the topic graph and object 450 is associated with a topic that has less than a specified degree of separation from a topic associated with the seed object 410 in the topic graph.

As described above in conjunction with FIG. 3, a score for candidate objects is determined based on a number of users connected to a candidate object who are also connected to the seed object as well as measures of relatedness between topics extracted from the candidate object and topics extracted from the seed object. In the example of FIG. 4, a score for objects 420 and 430 also accounts for a measure of relatedness between topics extracted from each of object 420 and 430 and the topics extracted from the seed object 410. Also in FIG. 4, a score for objects 440 and 450 may reflect that additional users are not connected to the objects 440 and 450 as well as to the seed object 410. However, if the topics associated with object 440 or with object 450 have large measures of relatedness to topics associated with the seed object 410, scores associated with object 440 or with object 450 may be larger than scores associated with object 420 or object 430 in some embodiments. Based on the scores, the social networking system 140 may select one or more of the objects 420, 430, 440, 450 for identification to the user 405 as described above in conjunction with FIG. 3.

SUMMARY

The foregoing description of embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of embodiments is intended to be illustrative, but not limiting, of the scope of the patent rights, which is set forth in the following claims.

What is claimed is:

1. A computer-implemented method comprising:
    maintaining, by a social networking system, a user profile for each of a plurality of users of the social networking system and a plurality of pages;
    maintaining connections between a user profile for a user of the social networking system and one or more of the plurality of pages maintained by the social networking system;
    selecting a seed page from the one or more pages connected to the user profile of the user;

extracting one or more topics from the seed page;
accessing a topic graph comprising information specifying relationships between a plurality of topics;
identifying one or more additional topics identified by the topic graph as related to at least one topic extracted from the seed page;
selecting one or more candidate pages, each candidate page associated with at least one of the additional topics;
identifying one or more additional users connected to the seed page via the social networking system;
determining a score for each of the one or more candidate pages, the score for a candidate object being determined based on a number of the one or more additional users connected to the candidate object and connected to the seed object;
ranking the one or more candidate pages based on the determined score for each candidate page;
selecting one or more of the candidate pages having at least a threshold position in the ranking; and
communicating information identifying the selected one or more candidate pages to a client device for presentation to the user.

2. The computer-implemented method of claim 1, wherein the topic graph identifies a plurality of topics and includes connections between topics related to each other.

3. The computer-implemented method of claim 2, wherein identifying one or more additional topics identified by the topic graph as related to at least one topic extracted from the seed page comprises:
identifying one or more additional topics directly connected to a topic extracted from the seed page from the topic graph.

4. The computer-implemented method of claim 2, wherein identifying one or more additional topics identified by the topic graph as related to at least one topic extracted from the seed page comprises:
identifying one or more additional topics indirectly connected to a topic extracted from the seed page by less than a specified number of intervening topics in the topic graph.

5. The computer-implemented method of claim 1, wherein accessing the topic graph comprising information specifying relationships between a plurality of topics comprises:
accessing information from a third-party system identifying a plurality of topics and additional topics related to each topic; and
generating the topic graph by storing connections between topics and additional topics identified by the accessed information as related to the topics.

6. The computer-implemented method of claim 1, wherein selecting one or more of the candidate pages based at least in part on one or more additional users connected to the seed page and connected to at least a set of the one or more candidate pages comprising:
selecting one or more candidate pages connected to at least a threshold number of additional users connected to the seed page.

7. A computer-implemented method comprising:
maintaining, by a social networking system, a user profile for each of a plurality of users of the social networking system and a plurality of pages;
maintaining connections between a user profile for a user of the social networking system and one or more objects maintained by the social networking system;
selecting a seed object from the one or more objects connected to the user;
extracting one or more topics from the seed object;
accessing a topic graph comprising information specifying relationships between a plurality of topics;
identifying one or more additional topics identified by the topic graph as related to at least one topic extracted from the seed object;
identifying one or more additional users of the social networking system who are connected to the seed object;
identifying candidate objects connected to at least a threshold number of the identified one or more additional users connected to the seed object;
selecting one or more of the candidate objects connected to at least a threshold number of additional users who are also connected to the seed object;
generating a score for each of the one or more candidate objects, the score for a candidate object based at least in part on:
1) a measure of relatedness between a topic extracted from the candidate object and the one or more topics extracted from the seed object, and
2) a number of the additional users connected to the candidate object and connected to the seed object;
ranking the one or more candidate objects based on the generated score for each candidate object;
selecting one or more of the candidate objects having at least a threshold position in the ranking; and
communicating information identifying the selected one or more candidate pages to a client device for presentation to the user.

8. The computer-implemented method of claim 7, wherein the topic graph identifies a plurality of topics and includes connections between topics related to each other.

9. The computer-implemented method of claim 8, wherein the measure of relatedness between the topic extracted from the candidate object and a topic extracted from the seed object is based at least in part on a type of connection between a topic extracted from the seed object and the topic extracted from the candidate object in the topic graph.

10. The computer-implemented method of claim 9, wherein the type of connection between the topic extracted from the seed object and the topic extracted from the candidate object is selected from a group consisting of: a direct connection between the topic extracted from the seed object and the topic extracted from the candidate object in the topic graph and an indirect connection between the topic extracted from the seed object and the topic extracted from the candidate object in the topic graph.

11. The computer-implemented method of claim 10, wherein the indirect connection between the topic extracted from the seed object and the topic extracted from the candidate object in the topic graph is based at least in part on a number of intervening topics between the topic extracted from the seed object and the topic extracted from the topic extracted from the seed object and the topic extracted from the candidate object.

12. The computer-implemented method of claim 8, wherein the measure of relatedness between the topic extracted from the candidate object and a topic extracted from the seed object is inversely proportional to a number of intermediate topics between the topic extracted from the candidate object and the topic extracted from the seed object in the topic graph.

13. The computer-implemented method of claim 7, wherein generating scores for each of the one or more candidate objects comprises:
    identifying objects associated with a topic having at least a threshold measure of relatedness to a topic extracted from the seed object;
    generating the score for each of the identified objects, the score associated with an identified object based at least in part on a measure of relatedness of the topic associated with the identified object to one or more topics extracted from the seed object and the number of additional users connected to the identified object and connected to the seed object.

14. The computer-implemented method of claim 7, wherein generating scores for each of one or more candidate objects comprises:
    identifying objects connected to at least a threshold number of additional users who are also connected to the seed object; and
    generating the score for each of the identified objects, the score associated with an identified object based at least in part on a measure of relatedness of a topic associated with the identified object to one or more topics extracted from the seed object and the number of additional users connected to the identified object and connected to the seed object.

15. A computer program product comprising a computer readable storage medium having instructions encoded thereon that, when executed by a processor, cause the processor to:
    maintain a user profile for each of a plurality of users of a social networking system and a plurality of pages;
    maintain connections between a user profile for a user of the social networking system and one or more objects maintained by the social networking system;
    select a seed object from the one or more objects connected to the user;
    extract one or more topics from the seed object;
    access a topic graph comprising information specifying relationships between a plurality of topics;
    identify one or more additional topics identified by the topic graph as related to at least one topic extracted from the seed object;
    identify one or more additional users of the social networking system who are connected to the seed object;
    identify candidate objects connected to at least a threshold number of the identified one or more additional users connected to the seed object;
    select one or more of the candidate objects connected to at least a threshold number of additional users who are also connected to the seed object;
    generate a score for each of the one or more candidate objects, the score for a candidate object based at least in part on:
        1) a measure of relatedness between a topic extracted from the candidate object and the one or more topics extracted from the seed object, and
        2) a number of the one or more additional users connected to the candidate object and connected to the seed object;
    ranking the one or more candidate objects based on the generated score for each candidate object;
    select one or more of the candidate objects having at least a threshold position in the ranking; and
    communicate information identifying the selected one or more candidate pages to a client device for presentation to the user.

16. The computer program product of claim 15, wherein the topic graph identifies a plurality of topics and includes connections between topics related to each other.

17. The computer program product of claim 16, wherein the measure of relatedness between the topic extracted from the candidate object and a topic extracted from the seed object is based at least in part on a type of connection between a topic extracted from the seed object and the topic extracted from the candidate object in the topic graph.

18. The computer program product of claim 17, wherein the type of connection between the topic extracted from the seed object and the topic extracted from the candidate object is selected from a group consisting of: a direct connection between the topic extracted from the seed object and the topic extracted from the candidate object in the topic graph and an indirect connection between the topic extracted from the seed object and the topic extracted from the candidate object in the topic graph.

* * * * *

UNITED STATES PATENT AND TRADEMARK OFFICE
CERTIFICATE OF CORRECTION

PATENT NO. : 10,027,765 B2  
APPLICATION NO. : 14/589835  
DATED : July 17, 2018  
INVENTOR(S) : Jason Eric Brewer Page 1 of 1

It is certified that error appears in the above-identified patent and that said Letters Patent is hereby corrected as shown below:

In the Claims

Column 16, Lines 58 to 60, Claim 11, delete "from the seed object and the topic extracted from the topic extracted from the seed object and the topic extracted from the candidate object" and insert -- from the seed object and the topic extracted from the candidate object --.

Column 17, Lines 6 to 7, Claim 13, delete "seed object; generating" and insert -- seed object; and generating --.

Signed and Sealed this  
Ninth Day of April, 2019

Andrei Iancu  
*Director of the United States Patent and Trademark Office*